July 5, 1927.
S. J. BENS
1,634,641
BEARING FOR LINK CHAINS AND BELTS
Original Filed Feb. 7, 1924
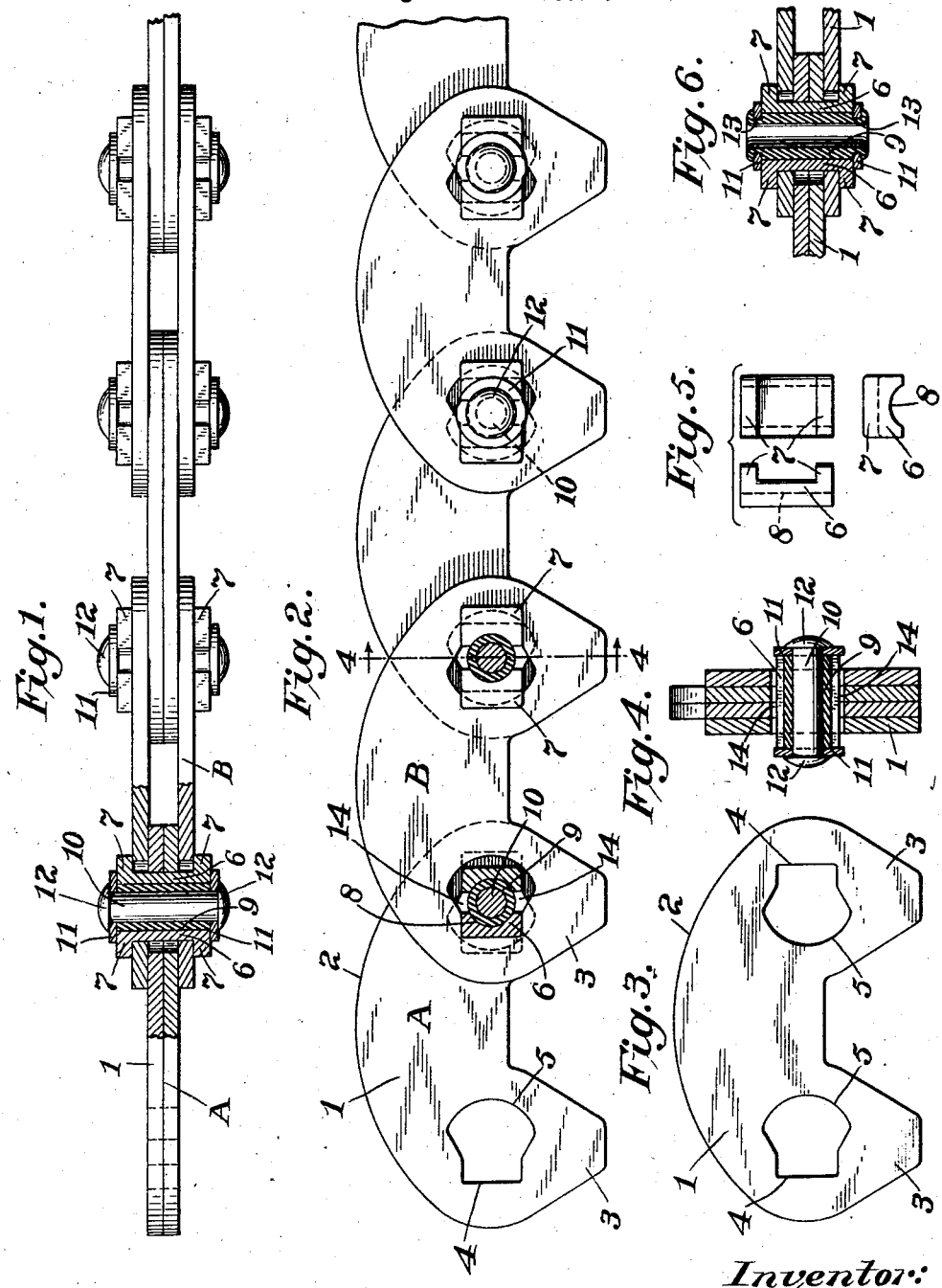
Inventor:
Samuel J. Bens,
by Spear, Middleton, Donaldson & Hall
Attys.

Patented July 5, 1927.

1,634,641

UNITED STATES PATENT OFFICE.

SAMUEL J. BENS, OF NEW YORK, N. Y.

BEARING FOR LINK CHAINS AND BELTS.

Application filed February 7, 1924, Serial No. 691,247. Renewed November 16, 1926.

This invention relates to a link belt or chain for power transmission or otherwise.

The principal object of my invention is the provision of such means whereby lateral displacement of the links is prevented, a compact, simple and cheap device is provided, and which will stand up under hard usage.

The invention further consists in the arrangement, combination and construction of parts more fully hereinafter described.

To this end my invention includes a link belt or chain built up of a plurality of individual link plates over-lapping each other, the ends of the plates terminating in teeth-like portions whereby the assembled chain may be made to engage sprocket teeth, or the like. Apertures are provided in each of the plates and so arranged that a portion of these apertures coincide in the over-lapped ends of the linked plates, and within this aperture is placed particular means about which the over-lapping link plates are made to pivot.

I have illustrated one preferred form of my invention in the accompanying drawings, in which:—

Figure 1 is an edge view, partly in section, of one embodiment of my invention.

Fig. 2 is a plan view, partly in section.

Figs. 3, 4, 5 and 6 are details of the link elements.

Referring now more particularly to the embodiment illustrated, I have shown the chain or belt to be made from plates such as is shown at 1, somewhat arc-shaped on one side, as at 2, and having the ends thereof terminate in teeth-like portions 3. As will be clearly seen from the drawings, there is left between the teeth-like portions 3 a recess which is adapted to engage the teeth on the sprocket wheel used for the purpose of transmitting power, as is well known and to which no claim is made.

Apertures at the ends of the plate 1 are provided having a rectangular portion 4 and an arcuate portion 5 for a purpose more fully described hereinafter. It will be seen that these apertures are placed in reverse order at the end of the link plates.

Two plates such as shown at 1 are imposed one on the other to form a single link of double thickness material. Over-lapping the ends of this link I now provide additional link plates, one above and one below the first assembled link. By so doing, it will be apparent that the apertures in the over-lapping ends of the four link plates will partially coincide.

Link A, which consists of two super-imposed link plates 1, has its end between the separated plates 1 comprising the link B. Within the rectangular portion 4 of the aperture in link B is provided a substantially U-shaped hardened bearing block 6, the right-angular ends 7 thereof, overlying that part of the link B adjacent the aperture. A similar block is located within the rectangular portion of the aperture in the end of the link A held between the ends of the link B. These two blocks thus retain links A and B in their proper relationship to each other. The blocks 6 are provided with arcuate grooves 8 which form bearing surfaces and are adapted to contact with a hardened sleeve 9 passing completely through the four link plates 1. A rivet 10 passing through the center of the hardened sleeve 9 may then be upset over washers 11, forming heads 12, in this way absolutely securing the links A and B together in an efficient manner.

It may be found desirable in some instances to extend the sleeve 9 upwardly beyond the top of the blocks 6, as a portion of reduced thickness, as shown at 13. In this case, the aperture in the washer 11 would be of a diameter less than the distance between the bearing surfaces 8 of the blocks 6. With such a construction, the reduced portion 13 of the sleeve 9 may then be upset onto the washer 11, which will accomplish the same result as a rivet in this place.

It will now be seen that the mechanism within the partially aligned apertures in the over-lapping ends of the link plates 1, prevents movement in any direction between the links A and B except a rotary one about the axis of the sleeve 9. It will be seen that the left-hand block 6 is substantially rigid with the link B, inasmuch as it is held within the rectangular portion 4 of the aperture in the plates comprising the link B. Therefore, as the link B moves in a rotary direction around the sleeve 9 as a pivot, it moves with it the left-hand block 6. Movement of this block in relation to the link A is made possible by reason of the fact that it moves within the arcuate portion 5 of the aperture in the link A. A similar, but reverse condition, obtains with the right-hand block 6, namely, it being rigid with the link A and movable with relation to the link B.

The sleeve 9 is used simply because it is not desirable to have the rivet 10 mushroom out into the space 14. If this were true, it would not be possible to rotate the links A and B. It may be found possible, and even desirable to dispense with the sleeve 9, but if such is the case, extreme care will be necessary in heading the rivet 10 to see that the space 14 is left clear so that the parts may move in relation to each other. The space 14 provides ample room for lubricant for the bearing surfaces.

Having thus described my invention, what I claim is:—

1. A link belt or chain comprising links having overlapping ends, pivot means passing through the overlapped ends, bearing blocks rigidly held in said links, said blocks having a flange at each end thereof overlying the links.

2. A link belt or chain comprising links having overlapping ends, a cylindrical element passing through said overlapped ends, headed bearing blocks rigidly held in said links engaging said cylindrical element, and a washer resting on said bearing block and engaging said cylindrical member to prevent movement thereof.

3. A link belt or chain comprising links having overlapping ends, a pivot passing through said overlapped ends, headed bearing blocks rigidly held in said links, a washer supported upon said bearing blocks, said pivot being headed over upon said washer.

4. A link belt or chain comprising links having overlapping ends, a pivot pin passing through said overlapped ends, a bearing sleeve surrounding said pivot pin, headed bearing blocks rigidly held in said links and engaging said sleeve, a washer resting upon said bearing blocks and engaging the top of said sleeve, said pivot pin being headed over onto said washer.

In testimony whereof, I affix my signature.

SAMUEL J. BENS.